US005638387A

United States Patent [19]
Palleggi et al.

[11] Patent Number: 5,638,387
[45] Date of Patent: Jun. 10, 1997

[54] ELECTRICALLY DRIVEN LIFT TRUCK

[75] Inventors: Guido Palleggi, Modugno; Fabrizio Lanza, Vado Ligure, both of Italy

[73] Assignee: Fiat Om Carrelli Elevatori S.p.A., Turin, Italy

[21] Appl. No.: 371,079

[22] Filed: Jan. 10, 1995

[30] Foreign Application Priority Data

Jan. 19, 1994 [IT] Italy ................................ MI94A0061

[51] Int. Cl.⁶ ......................................................... B60L 1/16
[52] U.S. Cl. .............................. 318/67; 318/799; 318/802
[58] Field of Search ..................................... 318/700, 705, 318/741, 757, 772, 727, 767, 768, 778, 779, 781, 798–802, 807–811

[56] References Cited

U.S. PATENT DOCUMENTS

| | | | |
|---|---|---|---|
| 3,559,009 | 1/1971 | Mills | 318/95 |
| 3,564,342 | 2/1971 | Sanders et al. | 318/93 |
| 3,614,567 | 10/1971 | Payne et al. | 318/305 |
| 4,157,467 | 6/1979 | Koeper | 235/92 |
| 4,393,338 | 7/1983 | Jones et al. | 318/86 |
| 4,411,582 | 10/1983 | Nakada | 414/636 |
| 4,485,623 | 12/1984 | Chichester et al. | 60/422 |
| 4,495,449 | 1/1985 | Black et al. | 318/60 |
| 4,500,818 | 2/1985 | Konrad et al. | 318/52 |
| 4,508,999 | 4/1985 | Melocik et al. | 318/331 |
| 4,585,982 | 4/1986 | Cooper et al. | 318/723 |
| 4,590,413 | 5/1986 | Gritter et al. | 318/803 |
| 4,723,107 | 2/1988 | Schmid | 322/35 |
| 4,724,332 | 2/1988 | Finger | 307/10 BP |
| 4,742,468 | 5/1988 | Ohashi et al. | 364/424 |
| 4,751,439 | 6/1988 | Buchwald et al. | 318/305 |
| 4,774,448 | 9/1988 | Yoshitomi | 318/746 |
| 4,811,994 | 3/1989 | Friedow | 303/115 |
| 4,942,529 | 7/1990 | Avitan et al. | 364/424.01 |
| 4,943,756 | 7/1990 | Conley, III et al. | 318/671 |
| 4,994,973 | 2/1991 | Makino et al. | 364/424.07 |
| 5,011,358 | 4/1991 | Andersen et al. | 414/273 |
| 5,039,924 | 8/1991 | Avitan | 318/139 |
| 5,068,790 | 11/1991 | Wellman | 364/424.02 |
| 5,070,283 | 12/1991 | Avitan | 318/139 |
| 5,119,000 | 6/1992 | Schultz | 318/254 |
| 5,119,011 | 6/1992 | Lambert | 320/43 |
| 5,136,219 | 8/1992 | Takahashi et al. | 318/139 |
| 5,177,419 | 1/1993 | Pickering et al. | 318/541 |
| 5,182,508 | 1/1993 | Schauder | 318/801 |
| 5,264,763 | 11/1993 | Avitan | 318/139 |
| 5,310,016 | 5/1994 | Rudelle | 180/65.1 |
| 5,585,983 | 12/1996 | Cooper et al. | 318/723 |

FOREIGN PATENT DOCUMENTS

| | | |
|---|---|---|
| 2098884 | 6/1993 | Canada. |
| 0376206A2 | 12/1989 | European Pat. Off.. |
| 0483894A1 | 10/1991 | European Pat. Off.. |
| 0576947A1 | 6/1993 | European Pat. Off.. |
| 3137077 | 5/1982 | Germany. |
| 3410293A1 | 9/1985 | Germany. |
| 3428118 | 2/1986 | Germany. |
| 2093217 | 2/1981 | United Kingdom. |

OTHER PUBLICATIONS

J. Kanabe et al., Industrielle Antriebe Fur Eleketrokeinwagen, Technische Rundschau, May 27, 1988, vol. 80, No. 22, pp. 86–89.

Soon Chang Hong et al., Microprocessor–based High–Efficiency Drive of a DC Motor, IEEE Transactions on Industrial Electronics and Control, Nov. 1987, vol. IE–34, No. 4, pp. 433–440.

*Primary Examiner*—Brian Sircus
*Attorney, Agent, or Firm*—Sheridan Ross P.C.

[57] ABSTRACT

A lift truck has a tractive-power electric motor, an electric motor which actuates a pump for the hydraulic circuits, and batteries which supply the electric motors. In order to obtain a long working life as well as reliability and a high performance, the tractive-power motor or both motors are asynchronous and there are provided devices for sensing the angular positions and angular velocities of the motors and an electronic control unit connected to the sensor devices for controlling the power supplies to the motors in dependence on required velocities for the motors and on the basis of data provided by the sensor devices.

18 Claims, 5 Drawing Sheets

ELECTRICALLY DRIVEN LIFT TRUCK

BACKGROUND OF THE INVENTION

The present invention relates to an electrically driven lift truck.

Electrically driven lift trucks usually have one or two electric motors for providing the tractive power to the truck and an electric motor for actuating a pump which supplies the hydraulic circuits of the truck. The motor or motors for the tractive power act on two front drive wheels of the lift truck and, more particularly, when two electric motors are provided each motor acts on a respective one of the two drive wheels. The hydraulic circuits connected to the pump actuated by the other electric motor include the hydraulic circuit for raising the forks and the hydraulic circuit for the power steering of the lift truck.

All these electric motors are dc motors and are supplied by batteries located on the lift truck.

As is well known, these dc electric motors, both those with permanent magnets and those with stator windings, have a commutator constituted by a ring of commutator segments and contact brushes for their operation. In use of the lift truck, the commutators of the electric motors are critical parts for various reasons.

First of all, the segments and the brushes are subject to mechanical wear so that their working life rarely exceeds 2000 hours in optimum conditions. This necessitates periodic stoppage of the lift truck and replacement of the commutator segments and brushes of the electric motors with consequent expense due to the inactivity of the truck and due to the maintenance itself.

Moreover a very high temperature develops in the commutator segments and this causes further problems.

Indeed it is necessary to cool the commutator segments by providing the electric motor with an internal cooling fan and by providing inlet and outlet apertures in the body of the motor for the air driven by the fan. The need to have these apertures prevents the internal parts of the motor from being insulated effectively and hence, when the lift truck operates in a dusty environment such as a cement factory, foundry, etc, the life of the commutator is reduced drastically compared with that indicated above for optimum working conditions of the lift truck.

It should also be noted that the temperature of the commutator segments cannot be checked directly by heat probes since it is a rotary part. Hence any overheating of the commutator segments is not detected and there is a possibility of malfunction or even seizing of the electric motor.

On the other hand, lift trucks with such dc motors have very satisfactory performances, particularly in terms of their ability to cope with an overload, controllability and speed of response.

SUMMARY OF THE INVENTION

The object of the present invention is to remedy the disadvantages outlined above while, at the same time, providing a lift truck with a high performance.

This object is achieved by means of an electrically driven lift truck including at least one electric motor for providing the tractive power for the drive wheels of the truck and an electric motor for actuating a pump which supplies hydraulic circuits of the truck, and having a dc supply for supplying the electric motors, characterised in that either the tractive-power motor or both the electric motors are asynchronous motors, in that sensor devices are provided for sensing the angular positions and angular speeds of the asynchronous motors, and in that an electronic control unit is connected to the sensor devices and controls the power supplies to the asynchronous motors in dependence on the required speeds of the motors and on the basis of data provided by the sensor devices.

BRIEF DESCRIPTION OF THE DRAWINGS

To provide a better understanding of the invention, a description of one embodiment is given below by way of non-limitative example, and is illustrated in the appended drawings in which.

DETAILED DESCRIPTION OF THE PREFERRED EMBODIMENT

Figure 1:
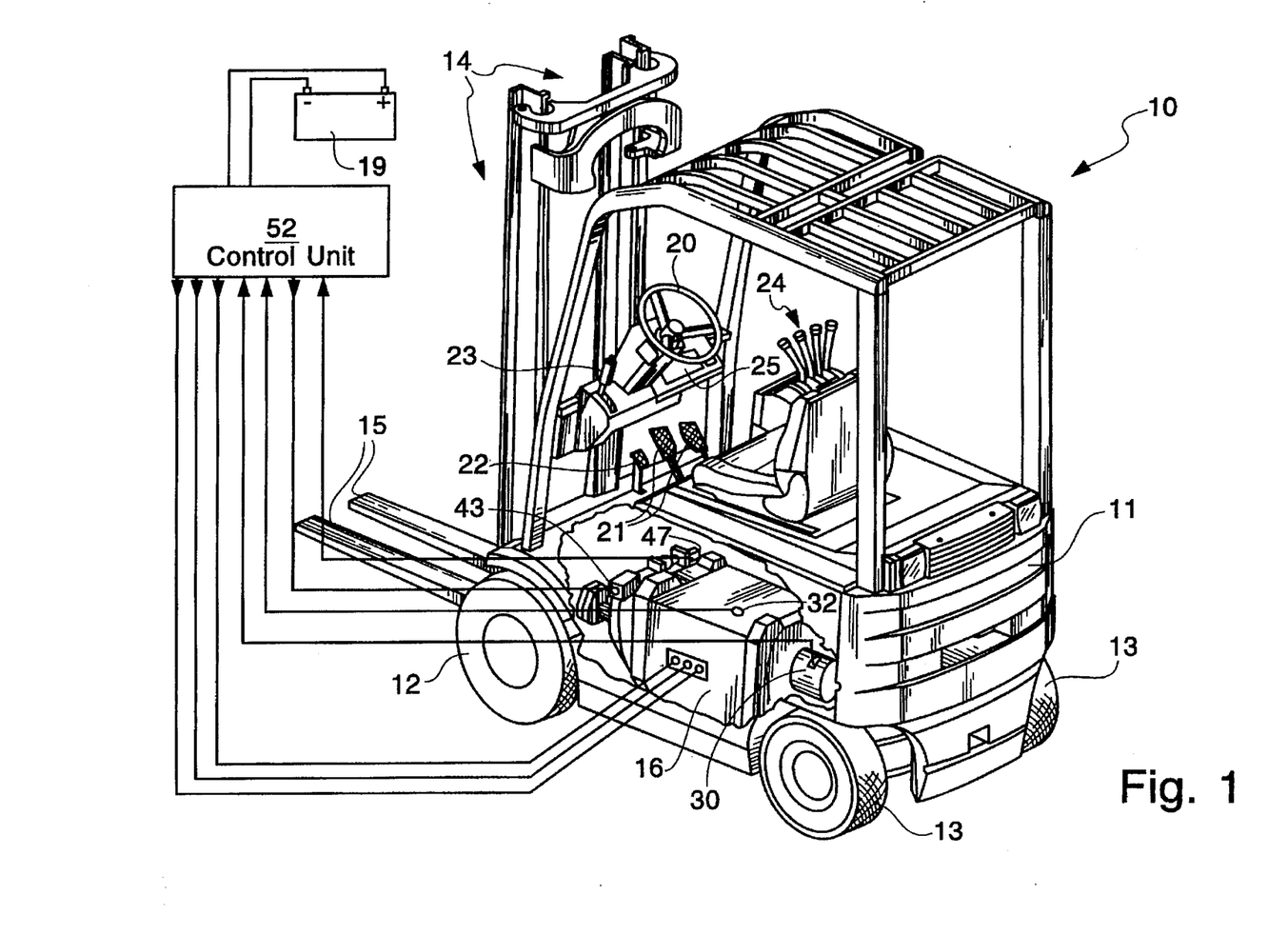
FIGS. 1, 2 are perspective views from above of a lift truck according to the invention from the rear left- and rear right-hand sides respectively, several parts of the lift truck shown in FIG. 1 being removed in FIG. 2.
Figure 2:
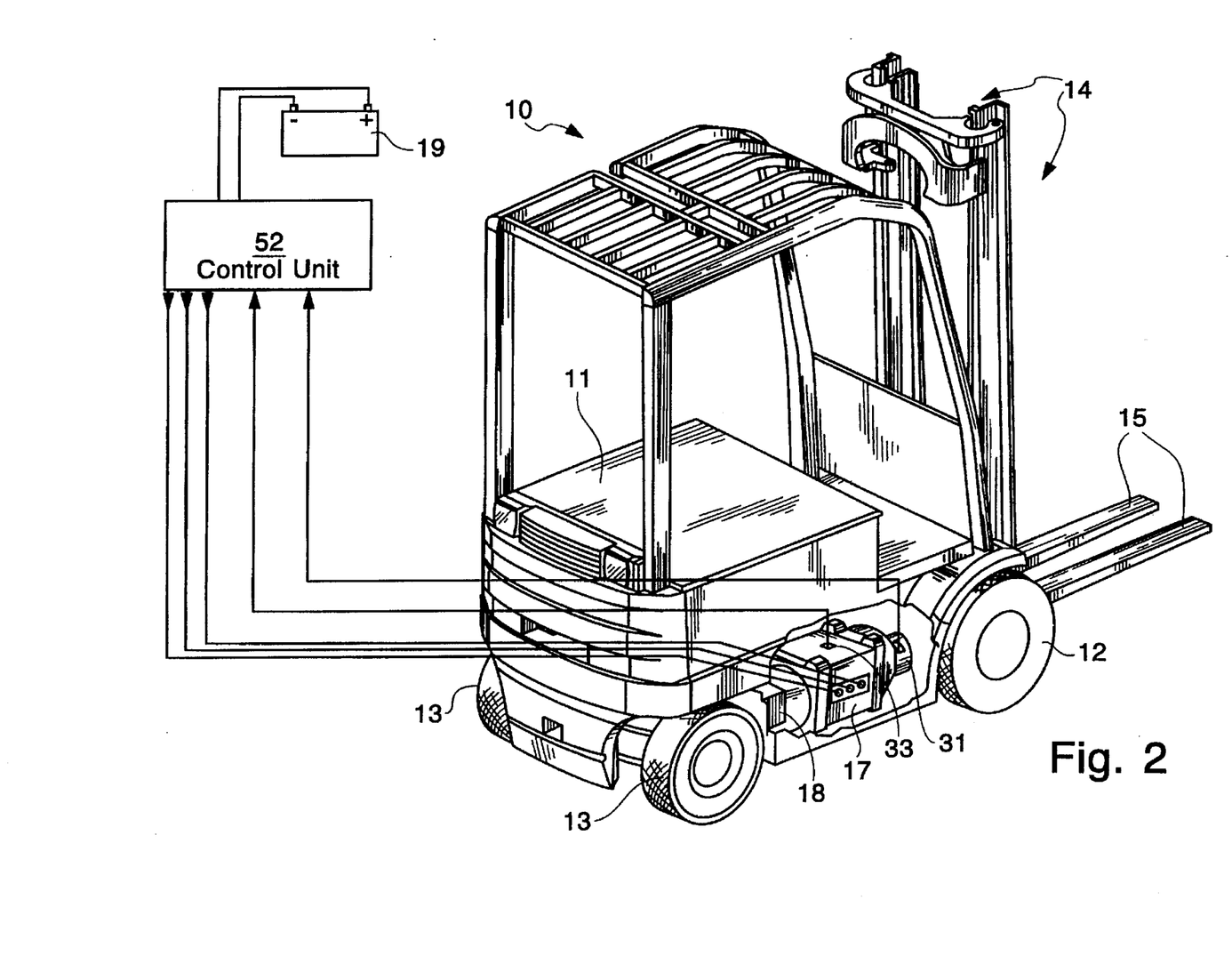

The lift truck illustrated in FIGS. 1, 2, generally indicated 10, includes a body 11, two front drive wheels 12, two rear steered wheels 13, and a front support frame 14 carrying the fork 15 on which the load rests.

The fork-lift truck 10 is electrically driven and for this purpose, is provided with an electric motor 16 for providing tractive power, illustrated in FIG. 1, connected to the drive wheels 12 and a further electric motor 17, illustrated in FIG. 2, connected to a pump 18 for supplying pressurised fluid to hydraulic circuits of the lift truck. These hydraulic circuits include a hydraulic circuit for actuating the support frame 14 to raise the fork 15 and a hydraulic circuit for a power steering system acting on the steered wheels 13. Batteries indicated schematically by a block 19 are mounted on the fork-lift truck 10 for supplying the electric motors 16 and 17.

For the maneuvering of the fork-lift truck 10 there are provided a steering wheel 20 connected to the steered wheels 13 through the power steering system, two accelerator pedals 21 of which one is for forward movement drive and the other is for reverse movement of the lift truck, a pedal 22 for the mechanical brake of the lift truck, a mechanical hand brake 23, and a set of levers 24 which control the vertical movement, inclination and lateral movement of the frame 14. The lift truck 10 also has a instrument panel 25.

Figure 3:
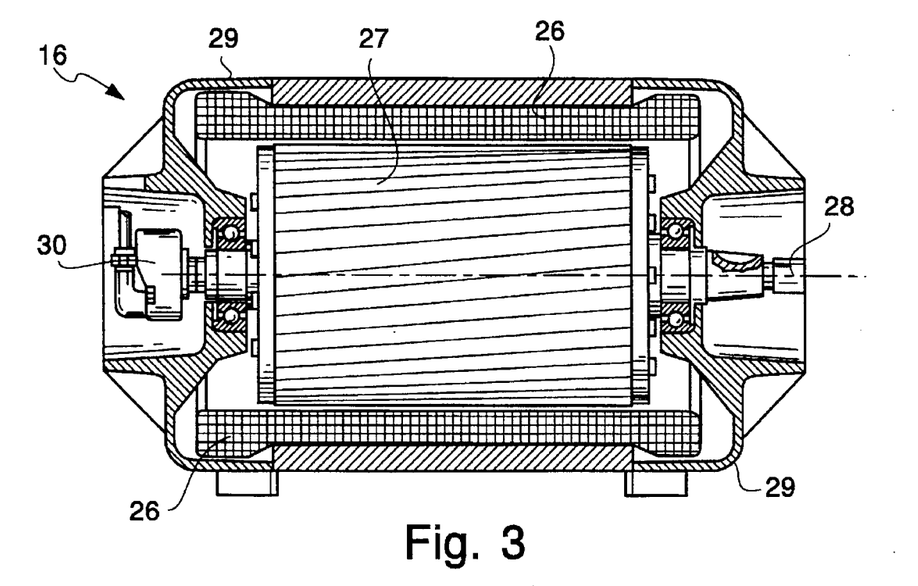
FIG. 3 is an axial section of the electric motor for providing the tractive power to the lift truck of FIGS. 1,2.

The electric motors 16 and 17 are three-phase asynchronous motors. FIG. 3 shows the structure of the motor 16, which provides the tractive power; the structure of the motor 17 which drives the pump 18 is entirely similar. The motor 16 includes a stator 26 constituted by a plurality of windings, a squirrel cage rotor 27, a drive shaft 28 fixed to the rotor 27 and an outer casing 29. As is well known, to operate such asynchronous motors 16 and 17, the stator windings are supplied by a three-phase current system which generates a rotary magnetic field and, through several physical phenomena, result in a system of forces which give rise to a drive torque acting on the rotor. Each of the motors 16 and 17 has fixed to its drive shaft an angular optical encoder, indicated 30 for the motor 16 and 31 for the motor 17; this encoder senses the angular position and angular speed of the drive shaft and outputs a corresponding electrical signal. A heat probe is also fitted to each of the two motors 16 and 17 and is indicated 32 for the motor 16 and 33 for the motor 17 and outputs an electrical signal which is a function of the temperature of the motor.

Figure 4:
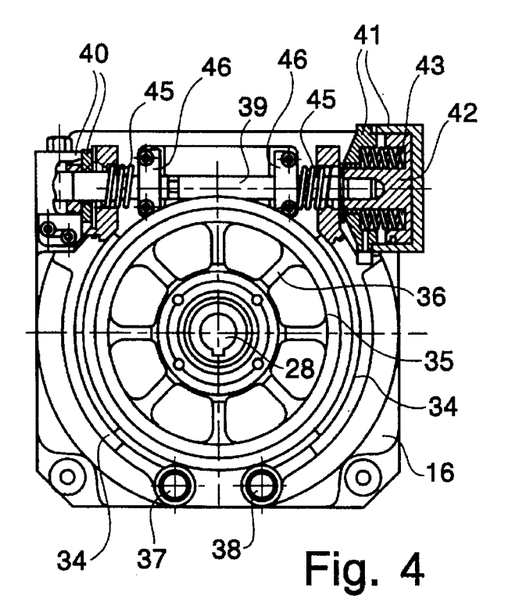
FIGS. 4, 5 show a brake unit mounted on the tractive power motor of FIG. 3 from the front and side respectively.
Figure 5:
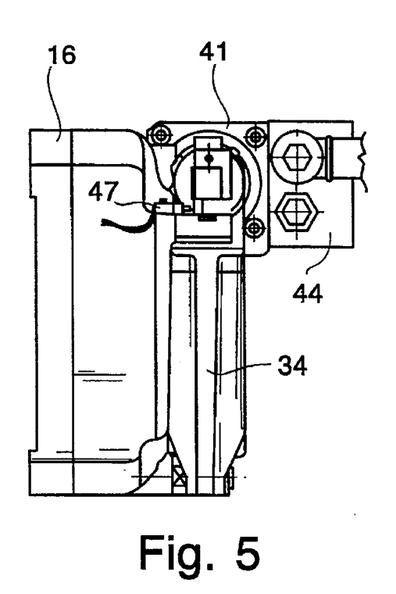

A mechanical brake unit illustrated in FIGS. 4 and 5 is also mounted on the tractive-power motor 16. This unit comprises two jaws 34 which act on a drum 35 which constitutes an outer annular casing of a cooling fan 36 for the motor 16, which fan is fixed coaxially on the drive shaft 28. The two jaws 34 are each pivoted at one end on the body of the motor 16 at a respective pivot point 37 or 38; a tie rod 39 acts on the other ends of the jaws 34 through two thrust bodies 40 and 41 at the ends of the tie rod. The body 40 is fixed to one of these ends of the tie rod 39. The body 41, however, is mounted so as to be movable relative to the other end of the tie rod 39 in that this end is fixed to a piston 42 slidable in the body 41. A stack of Belleville washers 43 acts on the piston 42 and, through the tie rod 39, exerts a constant force urging the two bodies 40 and 41 towards each other and hence causes a constant force to be exerted by these on the corresponding ends of the jaws 34 to keep them clamped against the drum 35. In order to move the jaws 34 away from the drum 35, a solenoid 44 is actuated to cause a pump 18 to pump pressurised fluid into the body 41 so as to move the piston 42 in the direction opposite the action of the Belleville washers 43; this movement of the piston 42 causes the two bodies 39 and 40 to move away from each other and hence, through the action of the helical springs 45 acting on the ends of the jaws 34 and reacting against elements 46 fixed to the body of the motor 16, causes the jaws 34 to move away from the drum 35. A microswitch 47 actuated by the movement of the body 40 enables the position of the jaws 34, whether clamped or released, to be detected.

Figure 6:
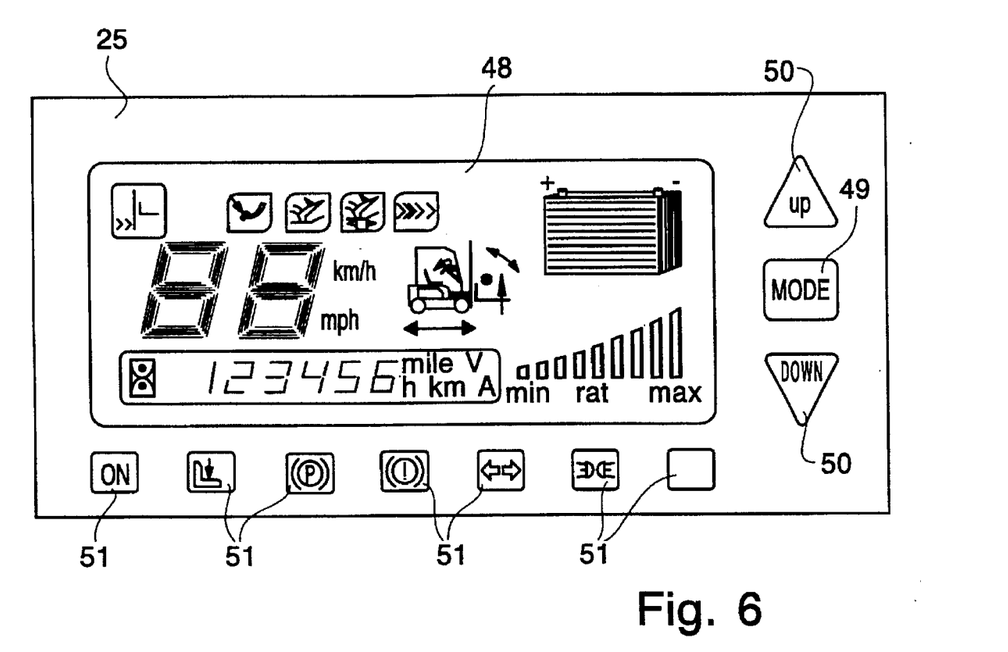
FIG. 6 shows an instrument panel of the lift truck of FIGS. 1, 2.

The instrument panel 25 includes a liquid-crystal display 48, a mode key 49, two selection and variation keys 50 and a series of indicator lights 51. Alphanumeric and graphic symbols relating to the operation of the lift truck 10 are shown on the display 48. The keys 49 and 50 enable operating parameters for the lift truck 10 to be programmed and shown by the display 48. The lights 51 indicate specific operating conditions of the lift truck 10.

With reference to FIGS. 1, 2, an electronic piloting and control microprocessor indicated 52 is provided for managing the operation of the lift truck 10.

Figure 8:
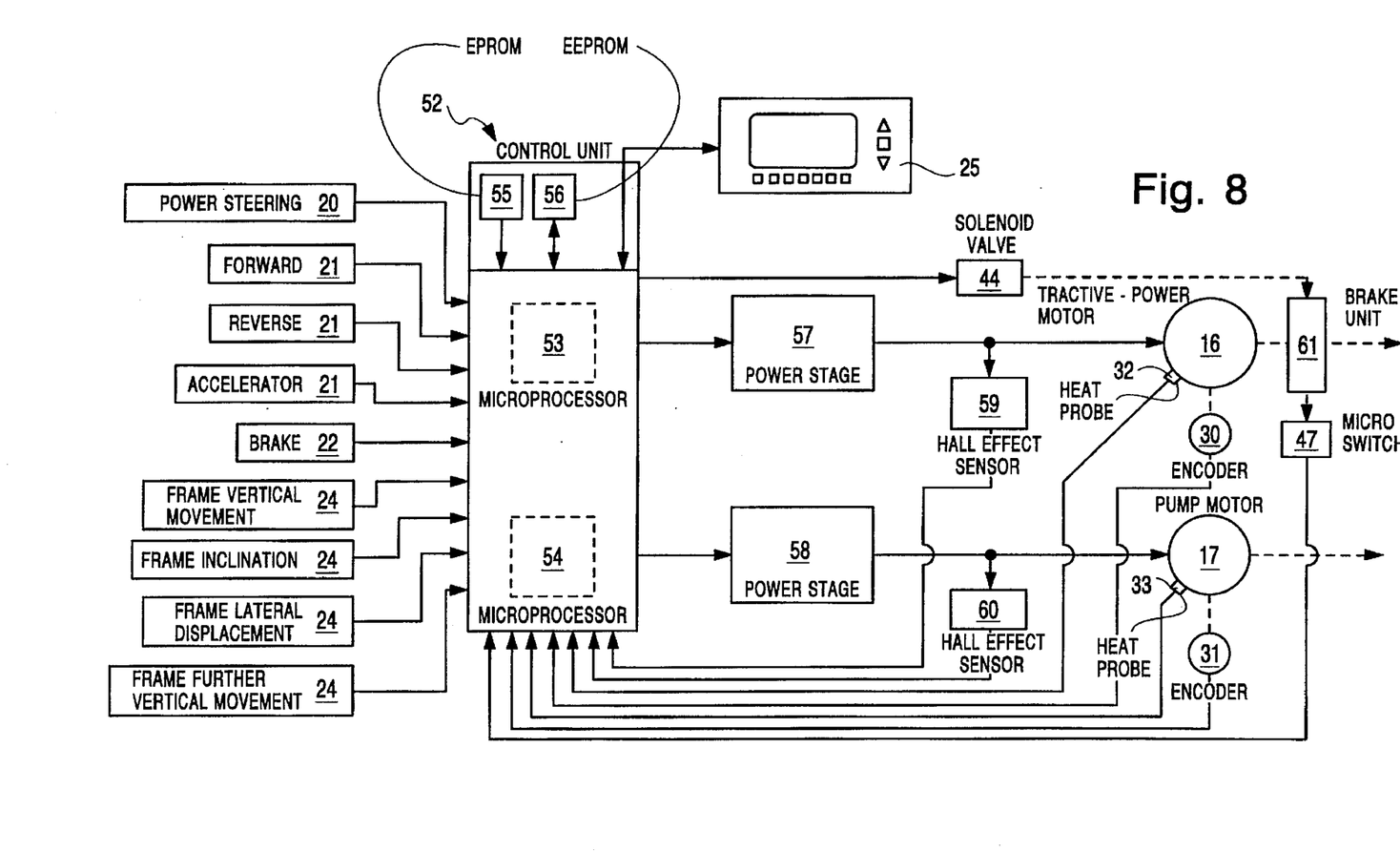
FIG. 8 is a block schematic diagram illustrating the operating and control system of the lift truck of FIGS. 1, 2.

FIG. 8 illustrates this management system in block schematic form. In this block schematic diagram the components already explained previously are indicated by the same reference numerals for reasons of clarity and simplicity.

The piloting and control unit 52 includes a microprocessor 53 dedicated to the tractive-power motor 16 and a microprocessor 54 dedicated to the motor 17 for actuating the pump 18 and subservient to the microprocessor 53. Both microprocessors 53, 54 are connected to an EPROM memory 55 which contains the programs which the microprocessors follow and the data which these microprocessors process and an EEPROM working memory 56 into which the microprocessors input data and from which they take data.

A series of controls is connected to the input of the unit 52. More particularly, the power steering control is indicated 20, the forward movement control, the reverse movement control and the accelerators are indicated 21, the brake control is indicated 22, and the controls for the vertical movement, inclination, lateral displacement and further vertical movement of the frame 14 are indicated 24.

The output of the unit 52 is connected to two power stages 57, 58 each of which is of the three-phase electronic switch (particularly MOSFET) type. The power stages 57, 58 are connected to the tractive-power motor 16 and to the motor 17 for supplying the pump 18 respectively.

The currents supplied to the motors 16 and 17 are monitored by two sensor systems, for example Hall-effect sensors, indicated 59 and 60 respectively.

The output of the unit 52 is also connected to the solenoid valve 44 which controls the flow of pressurised fluid to the brake unit of the motor 16 illustrated in FIGS. 4, 5. In FIG. 8 this brake unit is indicated by a block 61.

The sensor units 59, 60, the heat probes 32, 33 and the encoders 30 and 31 associated with the motors 16 and 17 and the microswitch 47 associated with the brake unit 61, are also connected in a feed back circuit to the unit 52.

There is also a two-way connection between the unit 52 and the instrument panel 25.

Figure 7:
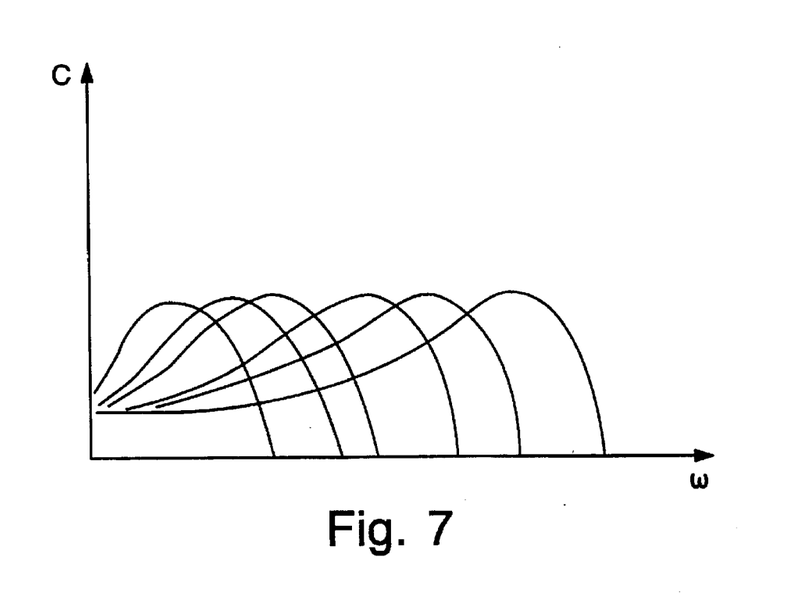
FIG. 7 is a torque/angular velocity graph relating to the tractive-power electric drive motor of FIG. 3.

With regard to the tractive power, depending which command signals have arrived, that is for forward movement or reverse acceleration or deceleration, and depending on the feedback signals arriving from the encoder 30 and from the sensor unit 59, the unit 52 pilots the power stage 57 connected to the batteries 19 so as to supply power to the motor 16 to move the lift truck 10 in accordance with the command which has been given. In practice, the microprocessor 53 supplies the motor 16 through the power stage 57 with three-phase alternating current of a strength and frequency such as to achieve the required direction of movement and speed while also calculating and monitoring angular position and angular velocity data provided by the encoder 30 and current values provided by the sensor unit 59. Thus it is possible to control the so-called slippage of the asynchronous motor 16 and, for each required speed of the lift truck 10 and hence of the motor 16, to give a maximum torque for the latter, as shown in FIG. 7 where the angular velocity of the motor (indicated by the letter omega) is shown on the abscissa while the torque of the motor (indicated by the letter C) is shown on the ordinate and which shows a set of torque/angular velocity curves obtainable by the said regulation. The motor 16 can thus be operated to give the optimum performance in all operating conditions.

There is a piloting and control system analogous to that explained above for operating the pump 18. The unit 52 and, more particularly the microprocessor 54, in accordance with the arrival of commands which involve actuation of the pump, and depending on the feedback signals from the encoder 31 and from the sensor unit 60, controls the power stage 58 connected to the batteries 19 so as to supply the motor 17 in such a manner as to actuate the pump 18 in accordance with the commands it receives. The maximum torque and hence the optimum performance is thus given for all operating conditions of the motor 17. The controls which control the actuation of the motor 17 and hence of the pump 18 are: the control 20 activated by movement of the steering wheel, the control 21 activated by pressure on the mechanical brake pedal, and the controls 24 activated by operation of the levers which actuate the frame 14; when the controls 21 and/or 22 are activated, pressurised fluid is supplied by the pump 18 to the hydraulic circuit of the power steering system while, when the controls 24 are activated, pressurised fluid is supplied by the pump 18 to the hydraulic circuit for activating the frame 14.

As regards the brake unit 61 for the motor 16, when no tractive-power is actuated, that is, when the pedals 21 are not depressed, this unit 61 is always operational, that is, the cup springs 43 keep the jaws 34 in contact with the drum 35 so as to keep the motor 16 stopped. When, however, one of the two pedals 21 is depressed, the unit 52 and, more particularly, the microprocessor 53, activates the solenoid valve 44 which causes pressurised fluid to flow into the body 41 so as to move the piston 42 and hence move the jaws 34 away from the drum 35 and free the shaft 28 of the motor 16 to rotate; the motor 16, piloted by the microprocessor 53, may then move the lift truck 10. The microswitch 47 enables the microprocessor 53 to sense that the brake device 61 is released so that the microprocessor may pilot the supply to the motor 16.

The display 48 and the lights 51 on the instrument panel 25 indicate operating conditions and parameters of the lift truck 10 as well as alarm situations. The alarm situations may be current overload of the motors 16 and 17, detected by the unit 52 through the sensor units 59 and 60 respectively, overheating of the motors 16 and 17 detected by the unit 52 through the heat probes 32 and 33, supply of the motors 16, 17 at too low or too high a voltage, and insufficient voltage supplied by the batteries 19, etc.

It is possible to vary the operating parameters of the lift truck by means of the keys 49 and 50 and the display 48. In particular, by pressing the key 49 once one enters the mode "select parameters" and, with the keys 50, one selects the parameters displayed by the display 48, such as the maximum velocity of the lift truck, the acceleration, the electrical braking, the speed of the power steering, the speed of raising of the frame 14, the speed of inclination of the frame, etc; by pressing the key 49 once more, one enters the mode "modify parameters" and then by pressing the keys 50 one varies the value of the parameter selected. By operating the keys 49 and 50 in the same sequence explained above, one may display the values of several operating parameters of the lift truck, such as the value of the current, and the voltage supplied by the batteries, the time of operation of the lift truck and of the two motors, and the total number of kilometres or miles travelled by the lift truck. Again by operating the keys 49 and 50 in the same sequence, one may display any alarm situations which have occurred.

The lift truck 10 described above and illustrated has numerous advantages.

First of all, the asynchronous motors 16 and 17 do not have commutators and thus all the disadvantages linked to the mechanical wear of the commutator of dc motors do not exist. Since there is no commutator there is no need for an internal cooling fan for the segments nor apertures in the body of the motor for the cooling air and hence the motor may be sealed so as to insulate it from the external environment and prolong its working life. An external cooling fan is used in each of the motors 16 and 17, and the heat probe, 32 and 33 respectively, enables the temperature of the motor to be controlled and enables it to be stopped if it overheats.

The motors 16 and 17 are also very quiet precisely because of the absence of the commutator and hence the sliding of the brushes on the segments. Moreover in these motors one is operating with sinusoidal electrical quantities and hence with limited harmonics; in lift trucks with dc motors however, these latter normally being governed by means of choppers, one is operating with electrical quanti-ties which have a very high range of harmonics and these harmonics can fall within the audible range and are thus irritating.

With regard specifically to the tractive power and its control system, the lift truck 10 has good performance and in particular:

a) The acceleration and the electrical braking are proportional to the position of the accelerator pedal 21 (as explained above there are two accelerator pedals 21, one for forward movement and the other for reverse but for simplicity, reference will be made below to one accelerator pedal); the control unit 52 sets the number of revolutions which the motor must make and maintains stability in a closed loop both during acceleration and during braking; starting with the motor 16 (and hence the drive wheels) at a low angular velocity and accelerating, the motor is controlled to bring it to the new operating condition, proportional to the position of the accelerator pedal; similarly, on release of the accelerator pedal, the motor is brought to a slower operating condition than previously, proportional to the released position of the accelerator pedal;

(b) the speed during downhill travel is inversely proportional to the slope faced by the lift truck; whenever considerable slopes are involved, the motor must always be able to stop the lift truck; if the lift truck accelerated during a descent could gain a higher kinetic energy than the energy which the motor can supply in stopping the truck; the control unit 52 limits the speed of the motor 16 during a descent, keeping it at the value set by the accelerator pedal 21 so that it is always within a safety margin such as to allow the motor to stop the lift truck;

(c) When the accelerator pedal 21 is fully released, the lift truck stops in whatever position it has reached; even on considerable slopes the lift truck remains immobile when the accelerator pedal is fully released; this is due to the fact that the fully-released position of the accelerator pedal is equivalent to the control unit 52 setting a nil velocity for the motor 16 and consequently supplying the motor so as to provide it with the necessary torque to stop and then with the torque necessary to keep the lift truck stopped, whether it is on a horizontal surface, or on an improved upward or downward slope;

d) the starting of the truck on a rising slope occurs without backward movement since the control unit 52 first of all enables the motor to supply the necessary torque to overcome the slope and then increases this torque to put the truck into motion.

The mechanical brake unit 61 which acts on the motor 16 continuously whenever one of the two accelerator pedals 21 is not depressed, helps to eliminate this backward movement during a hill start. This brake unit also prevents the truck from moving even when the power supply is stopped during an ascent without the hand brake 23 being operated. Finally, when the lift truck is stopped on a ramp without the power supply being stopped, the control unit 52 activates the brake unit several seconds after the lift truck has stopped and uses solely this brake unit device, and no longer the motor 16, to keep the lift truck stationary so as not to waste energy.

There is also an increase in productivity (in terms of tonnage/hour transported) of the fork-lift truck 10 compared with fork-lift trucks with dc drive motors. In fact, with the dc motor, during reversal of movement, it is necessary to wait before power can be applied again in order to avoid undesirable excess current and arcing at the commutator segments. With the asynchronous motor, which does not have a commutator, and by virtue of the control unit 52, the change from forward movement to reverse is immediate and hence there are no dead times.

From tests carried out it has been shown that the performance of the fork-lift truck 10 (in terms of work carried out/energy used) is better than that of lift trucks with dc motors. Inter alia, the control unit 52 has the possibility of controlling the motors 16, 17 by acting primarily on the frequency to set torque and velocity, and this enables the lift truck to be used, within certain limits, even when the battery is discharged.

In the lift truck 10, as in known lift trucks, during mechanical and electrical braking phases, the kinetic energy is converted into electrical energy in the batteries 19.

Finally, in the lift truck 10 there is no need to use the contactors provided in known lift trucks, these being essentially electromagnetically controlled electrical switches which invert the direction of the currents in the supply circuit to the tractive power motor at the change-over from forward to reverse movement and vice versa and which invert the connection between the motor and the batteries in braking with recovery of energy. Such remote-control switches, as is known, are bulky, become soiled and hence need periodic maintenance and, after a certain period of time deteriorate to the point where they have to be replaced.

Variations and/or additions to what has been described and illustrated may clearly be made.

Only the tractive power motor need be asynchronous. In this case the control unit could be dedicated either to both motors or to the tractive power motor alone. One would, however, gain little advantage.

Two asynchronous tractive power motors may be provided each suitably piloted and controlled, and acting it on a respective one of the two drive wheels.

The use of asynchronous motors of a type other than from that described and illustrated cannot be excluded even though this latter has undoubted advantageous characteristics.

The devices for sensing the angular position and angular velocity of the asynchronous motors may be magnetic encoders or other devices.

The brake unit which acts on the drive motor may also be varied, for example in its the mechanism which acts on the jaws, although the device explained above is particularly simple and effective. In general one may consider any type of brake either mechanical or otherwise, permanently in operation and which can be deactivated by a signal from the control unit.

The control and operating system may be varied and, in particular, the control unit and the instrument panel may be varied with regard to the number and functions of their components.

The general configuration of the lift truck illustrated, as well as the type and arrangement of its controls, may clearly be varied.

We claim:

1. An electrically driven lift truck comprising:
   (a) at least one electric motor for providing tractive power for drive wheels of the truck;
   (b) an electric motor for actuating a pump which supplies hydraulic circuits of the truck;
   (c) a dc power supply for supplying the electric motors, wherein the at least one electric motor for providing the tractive power or both electric motors are asynchronous motors;
   (d) an angular position sensor means for measuring the angular position of the asynchronous motor;
   (e) an angular speed sensor means for measuring the angular speed of the asynchronous motor; and
   (f) an electronic control unit connected to the angular position sensor means and the angular speed sensor means, wherein the electronic control unit controls the power input to the asynchronous motor, the power input being dependent on required speeds of the asynchronous motor and data provided by the angular position sensor means and the angular speed sensor means.

2. A lift truck according to claim 1, wherein an input section of the control unit is connected to a plurality of controls of the lift truck relating to the tractive power and to the hydraulic circuits supplied by the pump and is connected to a sensor device means including said angular position sensor means and said angular speed sensor means, wherein the sensor device means provides feedback data on parameters relating to the operation of the lift truck.

3. A lift truck according to claim 2, wherein the control unit has a two-way connection to an instrument panel including a display and a series of indicator lights for displaying operating conditions and parameters of the lift truck as well as alarm situations, and including keys for the input of, and variation of, operating parameters shown by the display.

4. A lift truck according to claim 2, wherein a brake unit is provided which acts continuously on the tractive-power motor and is deactivated by the control unit on the basis of commands relating to the traction.

5. A lift truck according to claim 3, wherein the control unit includes a first microprocessor dedicated to the tractive-power motor, a second microprocessor dedicated to the motor for actuating the pump, a first memory which contains the programs which the microprocessors follow and the data which the microprocessors process and a second memory into which the microprocessors input data and from which they take data.

6. A lift truck according to claim 2, wherein the control unit controls the power supply to the motors through power stages with electronic switch bridges.

7. A lift truck according to claim 3, wherein sensor units are provided to sense the currents in the supply circuits to the motors and which are connected in feedback circuits to the control unit.

8. A lift truck according to claim 3, wherein heat probes are applied to the motors to detect their temperatures and are connected in feedback circuits to the control unit.

9. A lift truck according to claim 3, wherein the keys are constituted by a mode key for displaying on the display the mode "select parameter" or "modify parameter", and two selection and variation keys for selecting the parameter to be varied and for varying the parameter.

10. A lift truck according to claim 3, wherein the keys also control the display on the display of values of operating parameters of the lift truck as well as alarms which have occurred.

11. A lift truck according to claim 4, wherein the brake-unit includes two jaws which act on a drum fixed to the drive shaft of the tractive-power motor and which are actuated by a tie-rod system drawn by resilient means to effect clamping of the jaws and adapted to be slackened by hydraulic actuator means to release the jaws.

12. A lift truck according to claim 11, wherein the drum constitutes the annular casing of an external cooling fan of the tractive-power motor.

13. A lift truck according to claim 11, wherein the control unit controls the supply to the hydraulic actuator means for releasing the brake unit through a solenoid valve.

14. A lift truck according to claim 11, wherein means are provided for detecting whether the jaws are in their clamped or released position and are connected in feed back circuit to the control unit.

15. A lift truck according to claim 14, wherein the said means are constituted by a microswitch operated by the hydraulic actuator means.

16. A lift truck according to claim 1, wherein the asynchronous motors have squirrel cage rotors and are sealed.

17. A lift truck according to claim 1, wherein the devices for sensing the angular positions and angular speeds of the asynchronous motors are optical encoders.

18. An electrically driven lift truck comprising:

(a) at least one electric motor for providing the tractive power for the drive wheels of the truck;

(b) an electric motor for actuating a pump which supplies hydraulic circuits of the truck;

(c) a dc power supply for supplying the electric motors, wherein the at least one electric motor for providing the tractive power or both electric motors are asynchronous motors;

(d) an angular position sensor means for measuring the angular position of the asynchronous motor;

(e) an angular speed sensor means for measuring the angular speed of the asynchronous motor;

(f) an electronic control unit connected to the angular position sensor means and the angular speed sensor means, wherein the electronic control unit controls the power input to the asynchronous motor with regard to the required speeds of the asynchronous motor and on the basis of data provided by the angular position sensor means and the angular speed sensor means;

(g) a plurality of controls of the lift truck connected to an input section of the electronic control unit, wherein the tractive power and the hydraulic circuits supplied by the pump are connected to a sensor device means including the angular position sensor means and the angular speed sensor means to provide feedback data on parameters relating to the operation of the lift truck;

(h) a two-way connection to an instrument panel connected to the electronic control unit, wherein the instrument panel includes:

a display, a series of indicator lights for displaying operating conditions and parameters of the lift truck as well as alarm situations, a set of keys for the input of, and variation of, operating parameters shown by the display, wherein the set of keys include a mode key for displaying on the display a mode "select parameter" or "modify parameter", and two selection and variation keys for selecting the parameter to be varied and for varying the parameter;

(i) a first microprocessor included in the electronic control unit, wherein the first microprocessor is dedicated to the tractive-power motor;

(j) a second microprocessor included in the electronic control unit, wherein the second microprocessor is dedicated to the motor for actuating the pump;

(k) a first memory included in the electronic control unit, wherein the first memory contains the programs that the microprocessors follow and the data that the microprocessors process; and (l) a second memory included in the electronic control unit, wherein the microprocessor inputs and retrieves data.

* * * * *